C. C. Johnson,
Bread Machine,

N°66,351. Patented July 2, 1867.

Witnesses:

Inventor:
Charles C. Johnson,
by
D. P. Holloway & Co.
his Atty's

United States Patent Office.

CHARLES C. JOHNSON, OF SPRINGFIELD, VERMONT.

Letters Patent No. 66,351, dated July 2, 1867.

IMPROVED DOUGH-KNEADER.

*The Schedule referred to in these Letters Patent and making part of the same.*

TO ALL WHOM IT MAY CONCERN:

Be it known that I, CHARLES C. JOHNSON, of Springfield, in the county of Windsor, and State of Vermont, have invented a new and useful improvement in Machines for Kneading Dough and Making Pastry; and I hereby declare that the following is a full, clear, and exact description of the same, reference being had to the annexed drawings, making part of this specification, in which—

I employ the same letters in both figures in the indication of identical parts.

Figure 2:
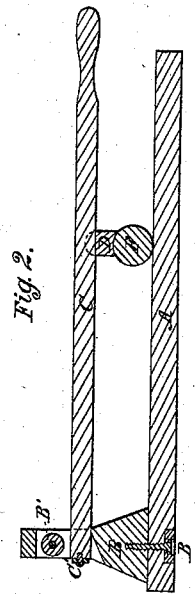
Figure 2 is a longitudinal vertical section.
Figure 1:
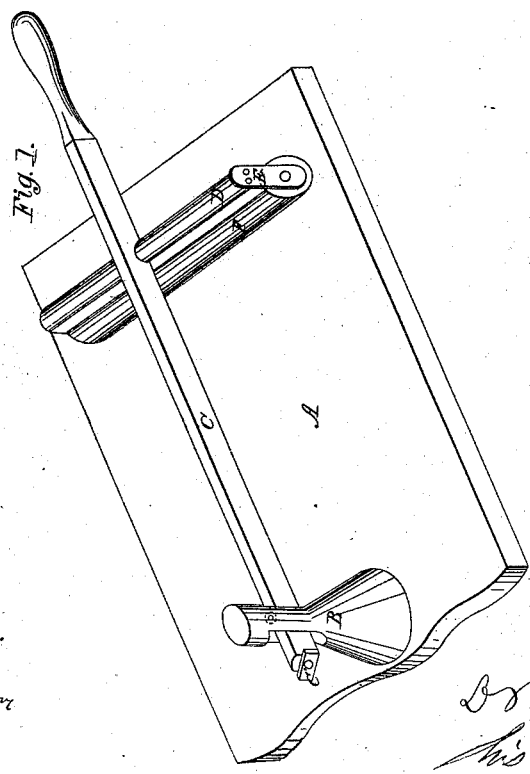
Figure 1 is a perspective view.

A is a smooth board or top of a table, having a plane face, to which is attached a revolving standard, B, turning freely on its axis B''. Near the upper end of this standard a slot is cut through it to receive the lever C passing through it. The upper side of the lever is rounded, and bears, when pressed upward in use, against a grooved friction-roller, B', placed in the slot through the standard C. The end of the lever is finished as a handle. To the under side of the lever is attached the cross-piece D, on each end of which the metallic strips E are permanently attached, having holes near their lower ends to form bearings for the journals of the roller F, which is placed immediately below the cross-piece D. The lower side of the cross-piece D is grooved to correspond with the curve of the roller, and so as to leave sharp edges on each side. The roller is placed close to this cross-piece, and the sharp edges of the latter serve to clean off any dough which may adhere to the roller. The lever and roller may be turned to any part of the table as the standard B revolves upon its own axis. The back side of the slot in the standard is bevelled, so as to be lower than the front side on the bottom thereof, thus providing a free vertical play to the roller, which may be raised and depressed, or moved laterally, as desired. A cleat, C', on the end of lever C, prevents the handle from being withdrawn from the standard. One or more rollers may be used.

By the foregoing arrangement of parts the roller and bearer may be used for kneading the dough, and then in rolling it into suitable sheets for use.

What I claim as new in my invention, and desire to secure by Letters Patent, is—

1. The combination of the revolving standard B, lever C, and one or more rollers F, and cross-pieces D, substantially as and for the purpose set forth.

2. The combination of the cross-piece D, when formed to act as a scraper, and the roller F, when attached to a lever, C, operating substantially as and for the purpose set forth.

In testimony whereof I have signed my name to this specification in the presence of two subscribing witnesses.

CHARLES C. JOHNSON.

Witnesses:
ALBERT BROWN,
E. A. ROBINSON.